United States Patent
Kim et al.

(10) Patent No.: US 9,124,115 B2
(45) Date of Patent: Sep. 1, 2015

(54) HIGH EFFICIENCY RECTIFIER, WIRELESS POWER RECEIVER INCLUDING THE RECTIFIER

(75) Inventors: Dong Zo Kim, Yongin-si (KR); Sang Wook Kwon, Seongnam-si (KR); Yun Kwon Park, Dongducheon-si (KR); Eun Seok Park, Suwon-si (KR); Young Tack Hong, Seongnam-si (KR); Ki Young Kim, Yongin-si (KR); Young Ho Ryu, Yongin-si (KR); Nam Yun Kim, Seoul (KR); Jin Sung Choi, Gimpo-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 13/330,859

(22) Filed: Dec. 20, 2011

(65) Prior Publication Data
US 2012/0155134 A1   Jun. 21, 2012

(30) Foreign Application Priority Data

Dec. 20, 2010 (KR) .......................... 10-2010-0130832

(51) Int. Cl.
| | |
|---|---|
| *H02M 7/04* | (2006.01) |
| *H02J 5/00* | (2006.01) |
| *H02M 7/06* | (2006.01) |
| *H02M 7/00* | (2006.01) |

(52) U.S. Cl.
CPC ............... *H02J 5/005* (2013.01); *H02M 7/00* (2013.01); *H02M 7/04* (2013.01); *H02M 7/06* (2013.01)

(58) Field of Classification Search
CPC ............ H02M 7/04; H02M 7/06; H02M 7/00
USPC ......... 363/84, 37, 44, 53, 60, 125, 67, 68, 69, 363/77, 126, 127; 257/88, 316
See application file for complete search history.

(56) References Cited

U.S. PATENT DOCUMENTS

| | | | | |
|---|---|---|---|---|
| 5,621,631 A | * | 4/1997 | Vinciarelli et al. | ............. 363/89 |
| 2007/0109827 A1 | | 5/2007 | DelaCruz | |
| 2007/0132008 A1 | * | 6/2007 | Kang et al. | .................... 257/316 |

(Continued)

FOREIGN PATENT DOCUMENTS

| | | |
|---|---|---|
| JP | 09-154276 | 6/1997 |
| KR | 20-0402306 | 11/2005 |

(Continued)

OTHER PUBLICATIONS

Korean Office Action issued Oct. 15, 2013 in counterpart Korean Patent Application No. 10-2010-0130832 (5 pages, in Korean).

*Primary Examiner* — Matthew Nguyen
*Assistant Examiner* — Trinh Dang
(74) *Attorney, Agent, or Firm* — NSIP Law

(57) ABSTRACT

A high efficiency rectifier and a wireless power receiver including the rectifier are provided. In one embodiment, a rectifier may be formed of a full bridge diode circuit and may include: a first dual diode, a second dual diode, a third dual diode and a fourth dual diode forming the full bridge diode circuit, the full bridge diode circuit including: a first path configured to output voltage when the phase of an input voltage is positive, via the first dual diode and the fourth dual diode; and a second path configured to output voltage when the phase of the input voltage is negative, via the second dual diode and the third dual diode. In another embodiment, a rectifier may include: at least two full bridge diode circuits connected in parallel.

7 Claims, 15 Drawing Sheets

(56) References Cited

U.S. PATENT DOCUMENTS

| | | | |
|---|---|---|---|
| 2007/0153557 A1* | 7/2007 | Ochoa | 363/125 |
| 2010/0109443 A1* | 5/2010 | Cook et al. | 307/104 |
| 2010/0308347 A1* | 12/2010 | Yeh et al. | 257/88 |
| 2011/0044035 A1* | 2/2011 | Chen et al. | 362/227 |

FOREIGN PATENT DOCUMENTS

| | | |
|---|---|---|
| KR | 10-2007-0053980 | 5/2007 |
| KR | 10-2009-0011509 | 2/2009 |

* cited by examiner $$\omega_{MZR} = \frac{1}{\sqrt{L_R C_L}}$$

HIGH EFFICIENCY RECTIFIER, WIRELESS POWER RECEIVER INCLUDING THE RECTIFIER

CROSS-REFERENCE TO RELATED APPLICATION(S)

This application claims the benefit under 35 U.S.C. §119 (a) of Korean Patent Application No. 10-2010-0130832, filed on Dec. 20, 2010, in the Korean Intellectual Property Office, the entire disclosure of which is incorporated herein by reference for all purposes.

BACKGROUND

1. Field

The following description relates to a rectifier which may be used with a wireless power receiver.

2. Description of Related Art

Resonance power may include electromagnetic energy. A conventional resonance power transferring system may transmit power wirelessly, and may include a source device that transmits a resonance power and a target device that transmits a resonance power. Resonance power may be transferred from the source device to the target device.

When an amount of current increases due to properties of a diode included in a conventional rectifier in a wireless power receiver (i.e., the target device of the wireless power transmission system), a voltage drop may increase due to resistance of the diode.

Various products, such as, for example, high-power applications that consume more than 100 W power and low-power applications that consume less than 10 W, have been studied. However, it has been found that for a wireless power transmission system that consumes about 10 W, the total efficiency is low, for instance, only about 60%.

SUMMARY

According to an aspect, a rectifier formed of a full bridge diode circuit may include: a first dual diode, a second dual diode, a third dual diode and a fourth dual diode forming the full bridge diode circuit, the full bridge diode circuit including: a first path configured to output voltage when the phase of an input voltage is positive, via the first dual diode and the fourth dual diode; and a second path configured to output voltage when the phase of the input voltage is negative, via the second dual diode and the third dual diode.

One or more of the first dual diode, the second dual diode, the third dual diode, and the fourth dual diode may include at least two diodes connected in parallel.

One of more of the at least two diodes may be a Schottky diode.

The at least two diodes may include three or more diodes.

The cathodes of the first dual diode and the second dual diode may be connected, the anodes of third dual diode and the fourth dual diode may be connected to a ground, the anode of the first dual diode and the cathode of the third dual diode may be connected, and the anode of the second dual diode and the cathode of the fourth dual diode may be connected.

The rectifier may further include: a pair of input paths configured to receive an AC signal, wherein one of the pair of input paths connects to the anode of the first dual diode and the cathode of the second third dual diode, and the other of the pair of input paths connects to the anode of the second dual diode and the cathode of the fourth dual diode.

The rectifier may further include a capacitor configured to accumulate the voltage output from the full bridge diode circuit.

The rectifier may further include a pair of output paths configured to output a voltage across the capacitor.

According to an aspect, a wireless power receiver may include: a target resonator configured to receive electromagnetic energy from a source resonator; and the rectifier configured to rectify the signal received from the target resonator, to output a signal.

The wireless power receiver may further include a DC/DC voltage converter configured to adjust a signal level of the output signal.

According to an aspect, a rectifier may include: at least two discrete full bridge diode integrated circuits (DFBD ICs), connected in parallel, wherein the at least two DFBD ICs each comprise an integrated IC including a full bridge diode circuit.

The rectifier may further include a capacitor configured to accumulate voltage output from the at least two DFBD ICs.

The at least two DFBD ICs may be configured to output a direct current (DC) voltage for an alternating current (AC) signal inputted to the at least two DFBD ICs.

The DC voltage may substantially correspond to a maximum amplitude of the AC signal.

The at least two DFBD ICs may each include four diodes arranged in a full bridge diode circuit configuration.

According to an aspect, a wireless power receiver may include: a target resonator configured to receive electromagnetic energy from a source resonator; and the rectifier configured to rectify an AC signal received from the target resonator, to output a signal.

The wireless power receiver may further include: a DC/DC voltage converter configured to adjust a signal level of the output signal.

According to an aspect, a rectifier may include: a first dual diode, a second dual diode, a third dual diode and a fourth dual diode arranged in a full bridge diode circuit.

The full bridge diode circuit may be an integrated circuit.

According to an aspect, a rectifier may include: at least two full bridge diode circuits connected in parallel.

Other features and aspects may be apparent from the following detailed description, the drawings, and the claims.

BRIEF DESCRIPTION OF THE DRAWINGS

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of well-known functions and constructions may be omitted for increased clarity and conciseness.

Figure 1:
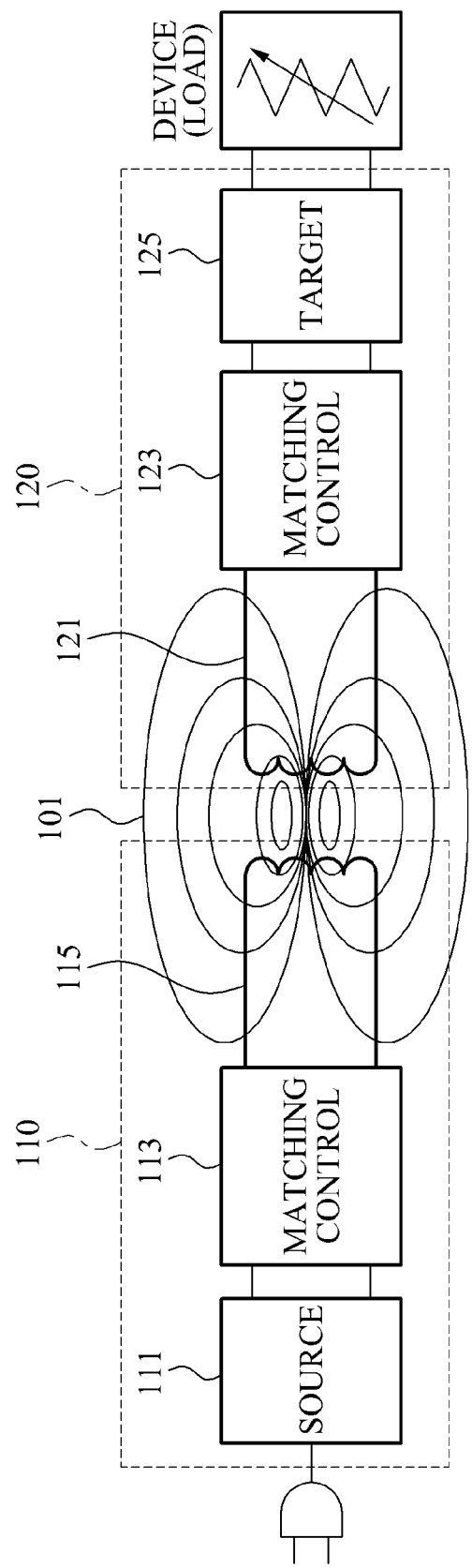
FIG. 1 is a diagram illustrating a wireless power transmission system.

FIG. 1 illustrates a wireless power transmission system.

In one or more embodiments, wireless power transmitted may be resonance power.

As shown in FIG. 1, the wireless power transmission system may have a source-target structure including a source and a target. For example, the wireless power transmission system may include a resonance power transmitter 110 corresponding to the source and a resonance power receiver 120 corresponding to the target.

The resonance power transmitter 110 may include a source unit 111 and a source resonator 115. The source unit 111 may be configured to receive energy from an external voltage supplier to generate a resonance power. In some instances, the resonance power transmitter 110 may further include a matching control 113 to perform resonance frequency or impedance matching.

The source unit 111 may include an alternating current (AC)-to-AC (AC/AC) converter, an AC-to-direct current (DC) (AC/DC) converter, and/or a (DC/AC) inverter. The AC/AC converter may be configured to adjust, to a desired level, a signal level of an AC signal input from an external device. And the AC/DC converter may output a DC voltage at a predetermined level by rectifying an AC signal output from the AC/AC converter. The DC/AC inverter may be configured to generate an AC signal (e.g., in a band of a few megahertz (MHz) to tens of MHz) by quickly switching a DC voltage output from the AC/DC converter. Of course, other frequencies of AC power may also be used.

The matching control 113 may be configured to, set at least one of a resonance bandwidth of the source resonator 115, an impedance matching frequency of the source resonator 115 or both. In some implementations, the matching control 113 may include at least one of a source resonance bandwidth setting unit and a source matching frequency setting unit. And the source resonance bandwidth setting unit may set the resonance bandwidth of the source resonator 115. The source matching frequency setting unit may set the impedance matching frequency of the source resonator 115. For example, a Q-factor of the source resonator 115 may be determined based on setting of the resonance bandwidth of the source resonator 115 or setting of the impedance matching frequency of the source resonator 115.

The source resonator 115 may be configured to transfer electromagnetic energy to a target resonator 121. For example, the source resonator 115 may transfer the resonance power to the resonance power receiver 120 through magnetic coupling 101 with the target resonator 121. Accordingly, the source resonator 115 may be configured to resonate within the set resonance bandwidth.

As shown, the resonance power receiver 120 may include the target resonator 121, a matching control 123 to perform resonance frequency or impedance matching, and a target unit 125 to transfer the received resonance power to a device or a load.

The target resonator 121 may be configured to receive the electromagnetic energy from the source resonator 115. The target resonator 121 may be configured to resonate within the set resonance bandwidth.

The matching control 123 may set at least one of a resonance bandwidth of the target resonator 121 and an impedance matching frequency of the target resonator 121. In some implementations, the matching control 123 may include at least one of a target resonance bandwidth setting unit and a target matching frequency setting unit. The target resonance bandwidth setting unit may set the resonance bandwidth of the target resonator 121. The target matching frequency setting unit may be configured to set the impedance matching frequency of the target resonator 121. For example, a Q-factor of the target resonator 121 may be determined based on setting of the resonance bandwidth of the target resonator 121 or setting of the impedance matching frequency of the target resonator 121.

The target unit 125 may be configured to transfer the received resonance power to the load. The target unit 125 may include an AC/DC converter and a DC/DC converter. And the AC/DC converter may generate a DC voltage by rectifying an AC signal transmitted from the source resonator 115 to the target resonator 121. For example, the DC/DC converter may supply a rated voltage to a device or the load by adjusting a voltage level of the DC voltage.

In one or more embodiments, the source resonator 115 and the target resonator 121 may be configured in a helix coil structured resonator, a spiral coil structured resonator, a meta-structured resonator, or the like.

Referring to FIG. 1, controlling the Q-factor may include setting the resonance bandwidth of the source resonator 115 and the resonance bandwidth of the target resonator 121, and transferring the electromagnetic energy from the source resonator 115 to the target resonator 121 through magnetic coupling 101 between the source resonator 115 and the target resonator 121. The resonance bandwidth of the source resonator 115 may be set to be wider or narrower than the resonance bandwidth of the target resonator 121 in some instances. For example, an unbalanced relationship between a BW-factor of the source resonator 115 and a BW-factor of the target resonator 121 may be maintained by setting the resonance bandwidth of the source resonator 115 to be wider or narrower than the resonance bandwidth of the target resonator 121.

For a wireless power transmission employing a resonance scheme, the resonance bandwidth may be an important factor. When the Q-factor (e.g., considering all of a change in a distance between the source resonator 115 and the target resonator 121, a change in the resonance impedance, impedance mismatching, a reflected signal, and/or the like), is Qt, Qt may have an inverse-proportional relationship with the resonance bandwidth, as given by Equation 1.

$$\frac{\Delta f}{f_0} = \frac{1}{Qt}$$ [Equation 1]
$$= \Gamma_{S,D} + \frac{1}{BW_S} + \frac{1}{BW_D}$$

In Equation 1, $f_0$ denotes a central frequency, $\Delta f$ denotes a change in a bandwidth, $\Gamma_{S,D}$ denotes a reflection loss between the source resonator 115 and the target resonator 121, $BW_S$ denotes the resonance bandwidth of the source resonator 115, and $BW_D$ denotes the resonance bandwidth of the target resonator 121. In Equation 1, the BW-factor may indicate either $1/BW_S$ or $1/BW_D$.

Due to an external effect, for example, a change in the distance between the source resonator 115 and the target resonator 121, a change in a location of at least one of the source resonator 115 and the target resonator 121, and/or the like, impedance mismatching between the source resonator 115 and the target resonator 121 may occur. The impedance mismatching may be a direct cause in decreasing an efficiency of power transfer. When a reflected wave corresponding to a transmission signal that is partially reflected and returned is detected, the matching control 113 may be configured to determine the impedance mismatching has occurred, and may perform impedance matching. The matching control 113 may change a resonance frequency by detecting a resonance point through a waveform analysis of the reflected wave. The matching control 113 may determine, as the resonance frequency, a frequency having a minimum amplitude in the waveform of the reflected wave.

The source resonator 115 and/or the target resonator 121 may have a resonator structure of FIGS. 7 through 14.

When a total efficiency of a system is greater than 60% as shown in Table 1, it may be determined that the system satisfies common specification efficiency. To obtain the common specification efficiency, operations performed in the system may have efficiencies greater than 85%, 90%, and 80%, respectively, as expressed in Table 1.

TABLE 1

| Operations for Wireless Power Transmission | Common Spec. Efficiency |
|---|---|
| signal generator of transmitter + power amplifier of transmitter | 85% |
| resonator of transmitter + resonator of receiver | 90% |
| rectifier of receiver + DC/DC converter of receiver | 80% |
| total | 60% |

To obtain efficiency of more than 80%, in an operation using the rectifier of the receiver and the DC/DC converter of the receiver, the rectifier of the receiver may need to obtain efficiency of 90%, since a commercialized DC/DC converter has an efficiency of 92%.

Properties of a conventional diode and properties of a conventional full bridge diode rectifier will next be described. As generally known, diodes are a two-terminal electronic component, having an anode (+) and cathode (−), that conduct electric current in substantially only one direction. Typically, diodes are semiconductors devices, such as, for example, Schottky diodes. Generally, a diode includes a resistance which properties vary based on the voltage applied to and the current flowing through the diode.

Figure 2:
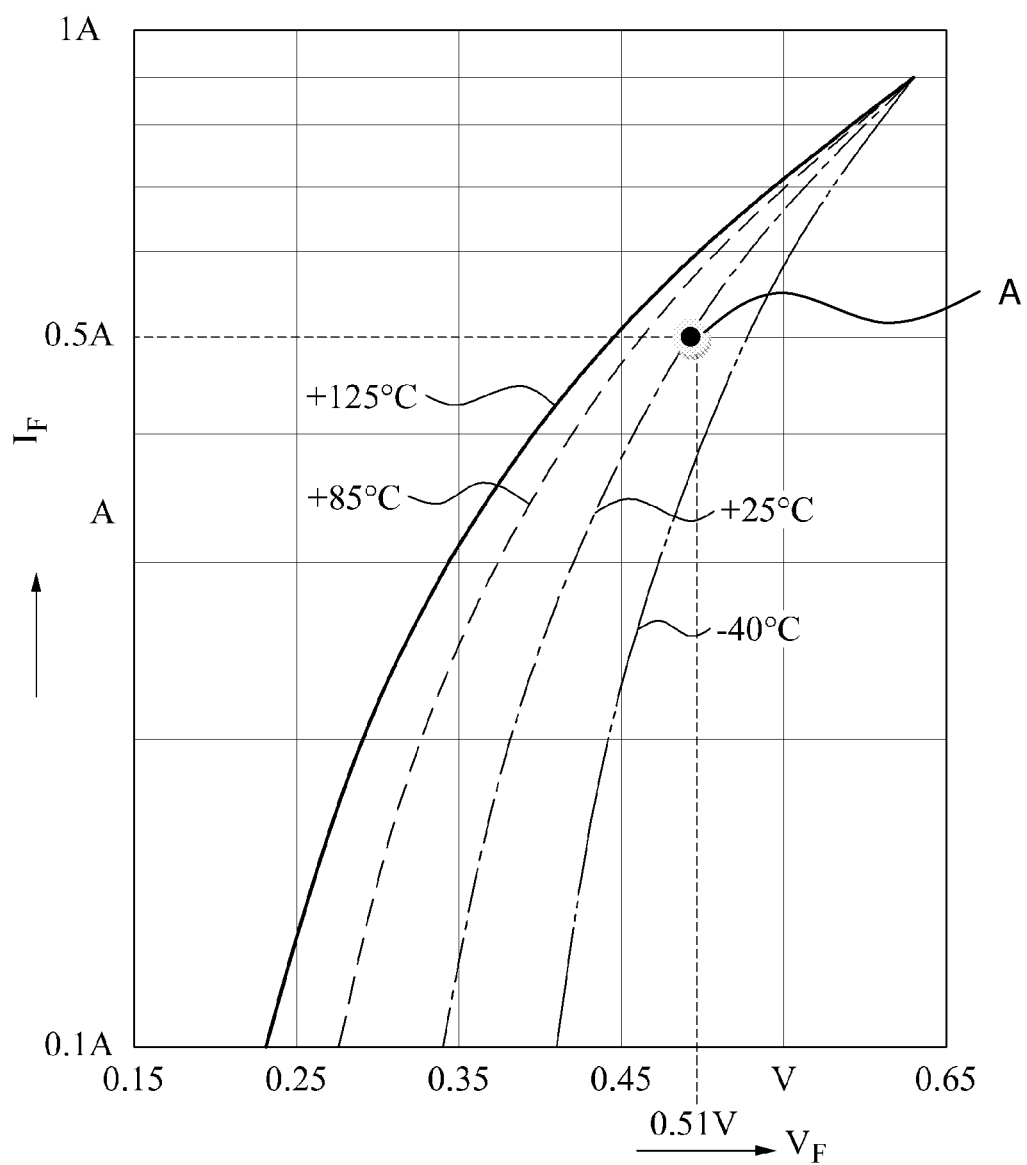
FIG. 2 is a diagram illustrating a current-to-voltage characteristic of a single Schottky diode used for wireless power transmission for a mobility device.

FIG. 2 illustrates current-to-voltage characteristic of a single Schottky diode used for wireless power transmission for a mobility device.

In particular, the plot in FIG. 2 shows voltage $V_F$ and current $I_F$ characteristics of the Schottky diode at various temperatures: −40° C., +25° C., +85° C., and +125° C.

At room temperature (i.e., approximately 25° C.)—when current $I_F$ does not flow through the diode—the activation voltage of the diode may be about 0.18 V. As the current increases, though, a voltage drop may increase. A similar phenomenon is seen for the diode at the other temperatures also.

For example, at point A in FIG. 2, when a current of 0.5 A flows though the diode at 25° C., the voltage drop may be about 0.51 V. The voltage drop due to the resistance may be calculated as 0.33V by subtracting the activation voltage of 0.18 V from the voltage drop of 0.51 V.

Figure 3:
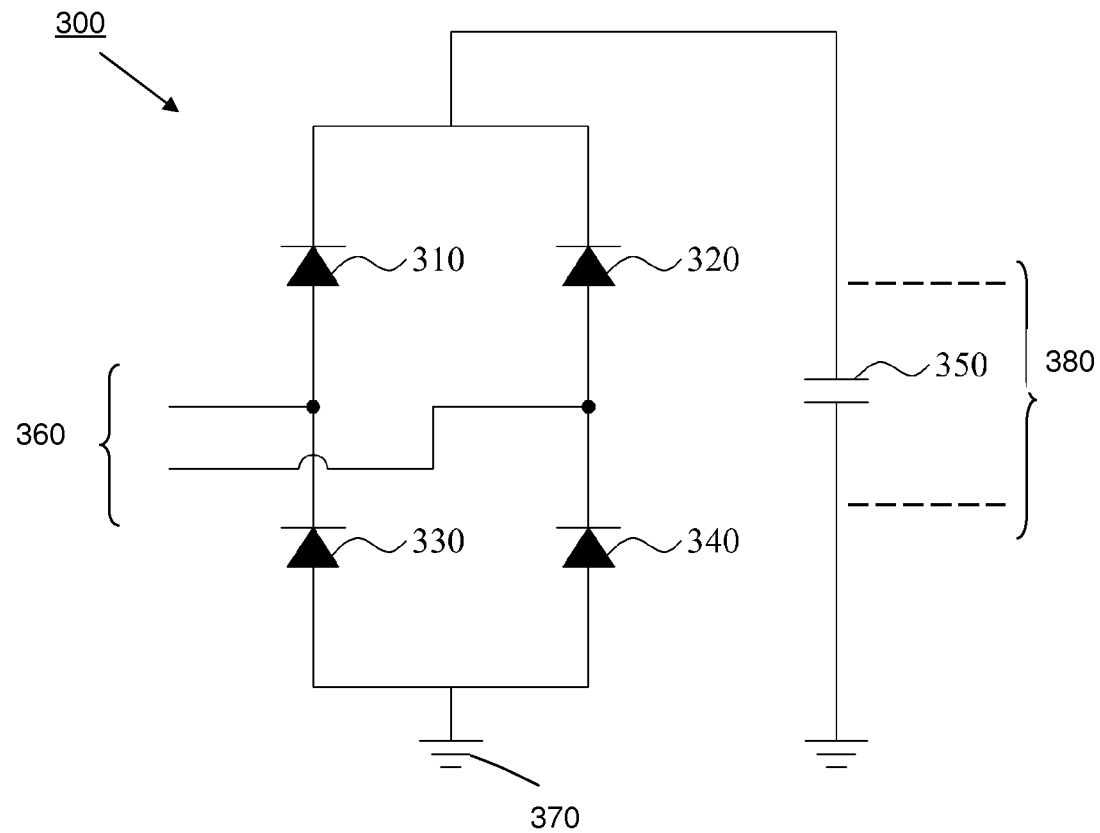
FIG. 3 is a diagram illustrating a conventional full bridge diode circuit rectifier.

FIG. 3 illustrates a conventional full bridge diode circuit rectifier 300.

As shown, the conventional full bridge diode circuit rectifier 300 includes four diodes: a first diode 310, a second diode 320, a third diode 330 and a fourth diode 340.

The cathodes of first diode 310 and the second diode 320 may be connected. As shown, cathodes of the first diode 310 and second diode 320 connect to a (reservoir) capacitor 350. The anodes of the third diode 330 and the fourth diode 340 may connect to a ground 370. And the anode of the first diode 310 and the cathode of the third diode 330 may be connected, while the anode of the second diode 320 and the cathode of the fourth diode 340 may be connected.

The rectifier 300 may connect to an input AC voltage source via input paths 360. One of input paths 360 (the top left one) may connect to the anode of the first diode 310 and the cathode of the third diode 330, while the other of input paths 360 (the bottom left one) may connect to the anode of the second diode 320 and the cathode of the fourth diode 340.

The full bridge diode circuit defines a first path and a second path for an AC signal input to the rectifier 300. The first path is configured to output voltage when the phase of the AC signal is positive, via the first diode 310 and the fourth diode 340, and may rectify voltage (i.e., convert AC to DC). And the second path is configured to output, voltage when the phase of the AC signal is negative, via the second diode 320 and the third diode 330, and may rectify voltage (i.e., convert AC to DC). The voltage outputted from the first and second paths may be accumulated in the capacitor 350, for instance.

Output voltage 380 may be measured and/or tapped (i.e., output), for example, across the capacitor 350. For instance, output paths (shown as dotted-lines) may be provided for receiving output voltage 380. Current may flow via two diodes in a single path for each of the first and second paths through the full bridge diode circuit. Therefore, when current flows through the full bridge diode rectifier, a voltage drop may be 2×0.51=1.02V. In this example, power consumed by the two diodes in the single path may be 1.02V×0.5 A=0.51 W.

The efficiency of a full bridge diode rectifier may be calculated using Equation 2.

$$\eta_{drop} = \frac{|P_{ac}| - 2P_{drop}}{|P_{ac}|} \quad \text{[Equation 2]}$$

In Equation 2 $\eta_{drop}$ may denote the efficiency of the full bridge diode rectifier, $P_{ac}$ may denote the inputted AC power, and $P_{drop}$ may denote power consumed due to the voltage drop of the full bridge diode rectifier. When it is assumed that a load consumes power of 2.5 W and an efficiency of a transmitter is 80%, an AC power may be 2.5÷0.8=3.125 W. The efficiency of the conventional full bridge diode rectifier may be calculated as expressed in Calculation 1 using Equation 2.

$$\eta_{drop} = \frac{|P_{ac}| - 2P_{drop}}{|P_{ac}|} = \frac{|3.125| - 0.51}{|3.125|} = 83.68\% \quad \text{[Calculation 1]}$$

When it is assumed that the load consumes power of 3 W and the efficiency of the transmitter is 80%, the inputted AC power may be 3÷0.8=3.75 W. The efficiency of the conventional full bridge diode rectifier may be calculated as expressed in Calculation 2 using Equation 2.

$$\eta_{drop} = \frac{|P_{ac}| - 2P_{drop}}{|P_{ac}|} = \frac{|3.75| - 0.51}{|3.75|} = 86.4\% \quad \text{[Calculation 2]}$$

Figure 5:
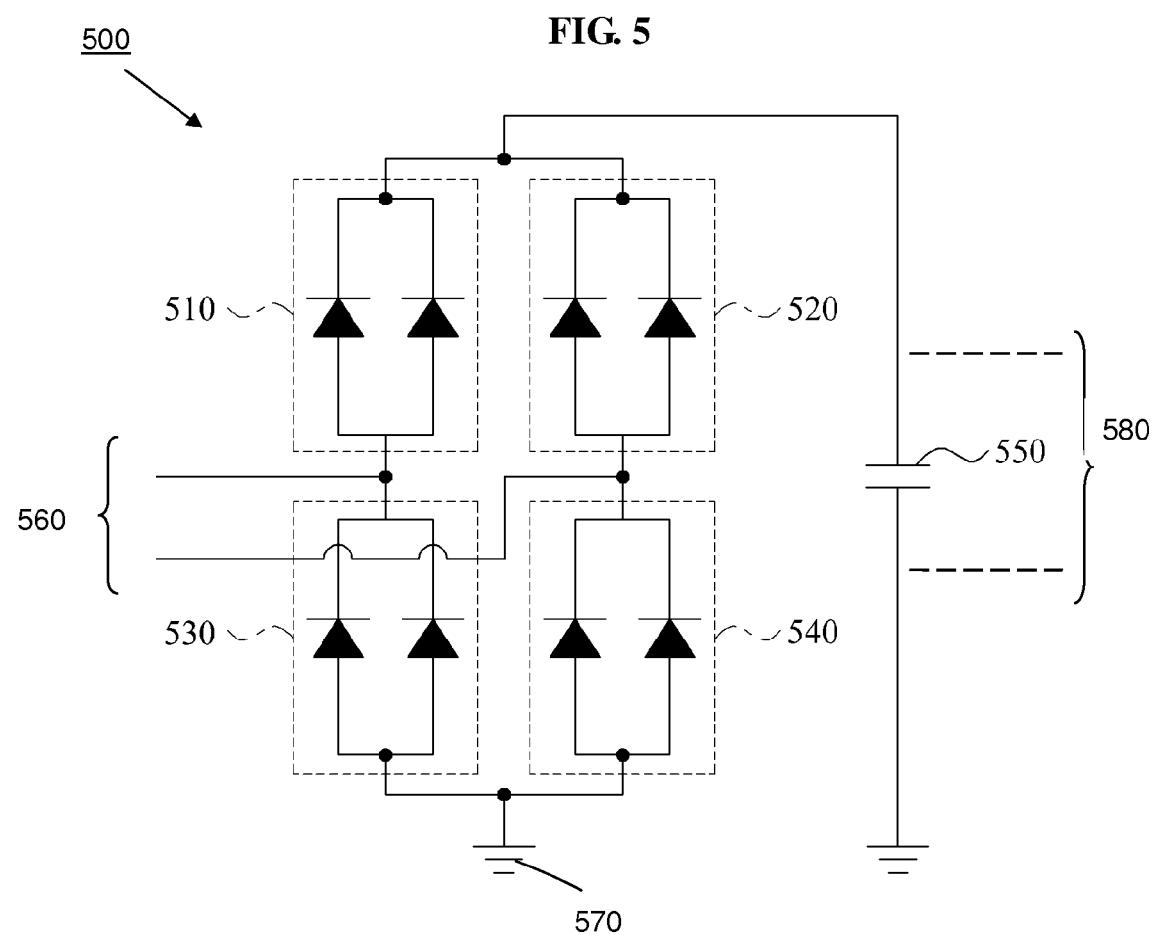
FIG. 5 is a diagram illustrating a full bridge diode rectifier constituted by dual diodes.

According to one or more embodiments, a full bridge diode circuit rectifier is disclosed formed of one or more dual diodes, which provide higher efficiency. As used herein, the term "dual diode" means at least two diodes connected in parallel to each other. For instance, the anodes of the diodes forming the dual diode are connected, and the cathodes of the diodes forming the dual diode are connected. FIG. 5, discussed below, illustrates four dual diodes: 510, 520, 530 and 540.

Figure 4:
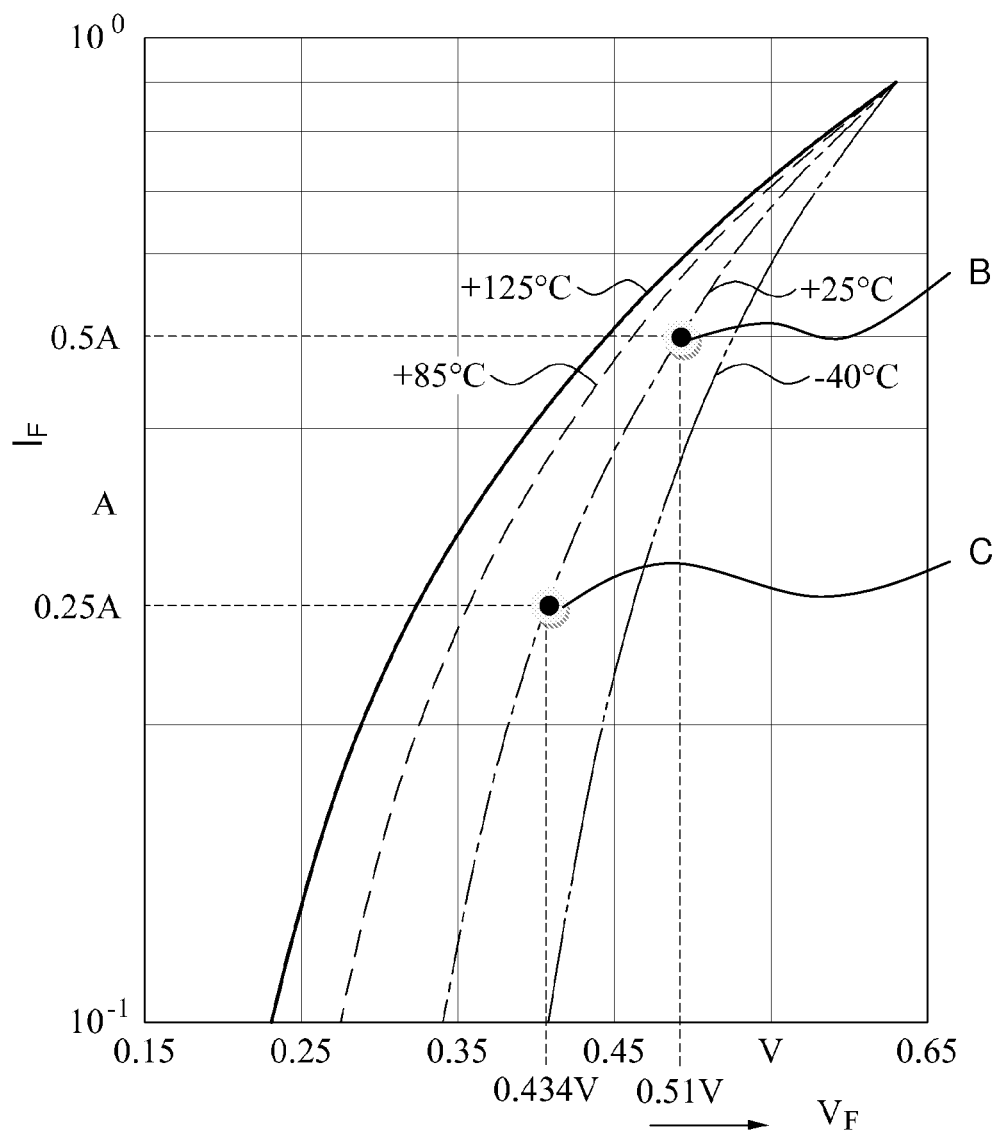
FIG. 4 is a diagram illustrating a current-to-voltage characteristic of a single diode vs. a dual diode.

FIG. 4 illustrates current-to-voltage characteristic of a single diode vs. a dual diode.

In particular, the plot in FIG. 4 shows voltage $V_F$ and current $I_F$ characteristics of a Schottky diode at various temperatures: (e.g., −40° C., +25° C., +85° C., and +125° C.).

Similar to point A shown in FIG. 2, at point B, when a current of 0.5 A flows through a single Schottky diode at 25° C., the Schottky diode has a voltage drop of about 0.51 V. The resistance of the Schottky diode may decrease when a small amount of current flows also. For example, when the activation voltage is 018 V, the voltage drop due to the resistance may be calculated as 0.33V by subtracting the activation voltage of 0.18 V from the voltage drop of 0.51 V. A similar phenomenon is seen for the dual diode at the other temperatures also.

By contrast, a dual diode enables current to concurrently flow via two or more paths and thus, may decrease a voltage drop. For example, when two Schottky diodes are connected in parallel in a dual diode, a current of 0.25 A may be flow via each of the two Schottky diodes (instead of 0.5 A for the single diode). As shown, at point C, for a current of 0.25 A for each of the two Schottky diodes at 25° C., each diode has a voltage drop of 0.434 V. The voltage drop in a resistance in each of the two Schottky diodes may be calculated as 0.254 V by subtracting the activation voltage of 0.18 V from the voltage drop of 0.434 V.

Thus, it will be appreciated that the total voltage drop has been decreased by about 0.076 V when a dual diode formed of two Schottky diodes connected in parallel is used as compared to using just a single diode.

FIG. 5 illustrates a full bridge diode rectifier 500 formed of dual diodes.

As shown, the full bridge diode rectifier 500 includes a full bridge diode circuit formed of a first dual diode 510, a second dual diode 520, a third dual diode 530 and a fourth dual diode 540.

The cathodes of first dual diode 510 and the second dual diode 520 may be connected. As shown, cathodes of the first dual diode 510 and second dual diode 520 connect to a (reservoir) capacitor 550. The anodes of the third dual diode 530 and the fourth dual diode 540 may connect to a ground 570. And anode of the first dual diode 510 and the cathode of the third dual diode 530 may be connected, while the anode of the second dual diode 520 and the cathode of the fourth dual diode 540 may be connected.

The rectifier 500 may connect to an input AC voltage source via input paths 560. One of input paths 560 (the top left one) may connect to the anode of the first dual diode 510 and the cathode of the third dual diode 530, while the other of input paths 560 (the bottom left one) may connect to the anode of the second dual diode 520 and the cathode of the fourth dual diode 540. The voltage outputted from the first and second paths may be accumulated in the capacitor 550, for instance.

The full bridge diode circuit defines a first path and a second path for an AC signal input to the rectifier 500. The first path may output voltage when a phase of the AC signal is positive, via the first diode 510 and the fourth diode 540, and may rectify the voltage (i.e., convert AC to DC).

The second path may output voltage when the phase of the AC signal is negative, via the second diode 520 and the third diode 530, and may rectify the accumulated voltage (i.e. convert AC to DC). For example, each of dual diodes (i.e., the first dual diode 510, the second dual diode 520, the third dual diode 530, and the fourth dual diode 540), may include at least two diodes connected in parallel. One or more of the diodes included in each of the dual diodes may be Schottky diodes, for example. Of course, it will be appreciated that other type of diodes may also be used.

Output voltage 580 may be measured and/or tapped (i.e., output), for example, across the capacitor 550. For example, output paths (shown as dotted-lines) may be provided for receiving output voltage 580. The capacitor 550 need not be provided in all embodiments. Although, it will be appreciated that the addition of the capacitor 550 may be desirable because while the bridge supplies an output of fixed polarity, it is of continuously varying or "pulsating" magnitude, commonly referred to as "ripple." Thus, the capacitor 550 helps to "smooth" or to lessen the variation in the rectified AC output voltage from the bridge.

In some embodiments, the full bridge diode rectifier 500 may be fabricated as an integrated circuit. Of course, the full bridge diode rectifier may also be wired together and/or otherwise connected without integrated packaging. In the full bridge diode rectifier formed of dual diodes, current may flow via two dual diodes in a single path for each of the first and second paths through the full bridge diode circuit. Because the diodes of the dual diode are connected in parallel, current is substantially split among those diodes. For example, when a current of 0.5 A flows through a dual diode formed of two diodes, a current of 0.25 A may flow via each of the two diodes constituting the dual diode. Therefore, a voltage drop may be 2×0.434=0.868V. And, the power consumed by the dual diodes in the single path may be 0.868V×0.5 A=0.434 W.

When it is assumed that a load consumes power of 2.5 W and the efficiency of the transmitter is 80%, an inputted AC power may be 2.5÷0.8=3.125 W. The efficiency of the full bridge diode rectifier formed of dual diodes may be calculated as expressed in Calculation 3 using Equation 2.

$$\eta_{drop} = \frac{|P_{ac}| - 2P_{drop}}{|P_{ac}|} = \frac{|3.125| - 0.434}{|3.125|} 86.11\% \quad \text{[Calculation 3]}$$

When it is assumed that the load consumes power of 3 W and the efficiency of the transmitter is 80%, the inputted AC power may be 3÷0.8=3.75 W. The efficiency of the full bridge diode rectifier formed of dual diodes may be calculated as expressed in Calculation 4 using Equation 2.

$$\eta_{drop} = \frac{|P_{ac}| - 2P_{drop}}{|P_{ac}|} = \frac{|3.75| - 0.434}{|3.75|} = 88.42\% \quad \text{[Calculation 4]}$$

Comparisons between Calculation 1 and Calculation 3, and between Calculation 2 and Calculation 4, show that the efficiency increases by 2% to 3% when the full bridge diode rectifier formed of dual diodes is used instead of single diodes.

While the aforementioned embodiments provide the full bridge diode rectifier formed of the dual diodes, in some embodiments the dual diode may be formed of three or more diodes connected in parallel. However, in some instances, it has been found that the full bridge diode rectifier formed of three or more diodes connected in parallel may not be significantly more efficient than one formed of two diodes connected in parallel. In one example, it was found that the efficiency of the three diode embodiment was improved by no more than 1%, when compared to the full bridge diode rectifier formed of two diodes.

In one or more other embodiments, a plurality of full bridge diode circuit rectifiers may be connected in parallel to provide higher efficiency.

Figure 6:
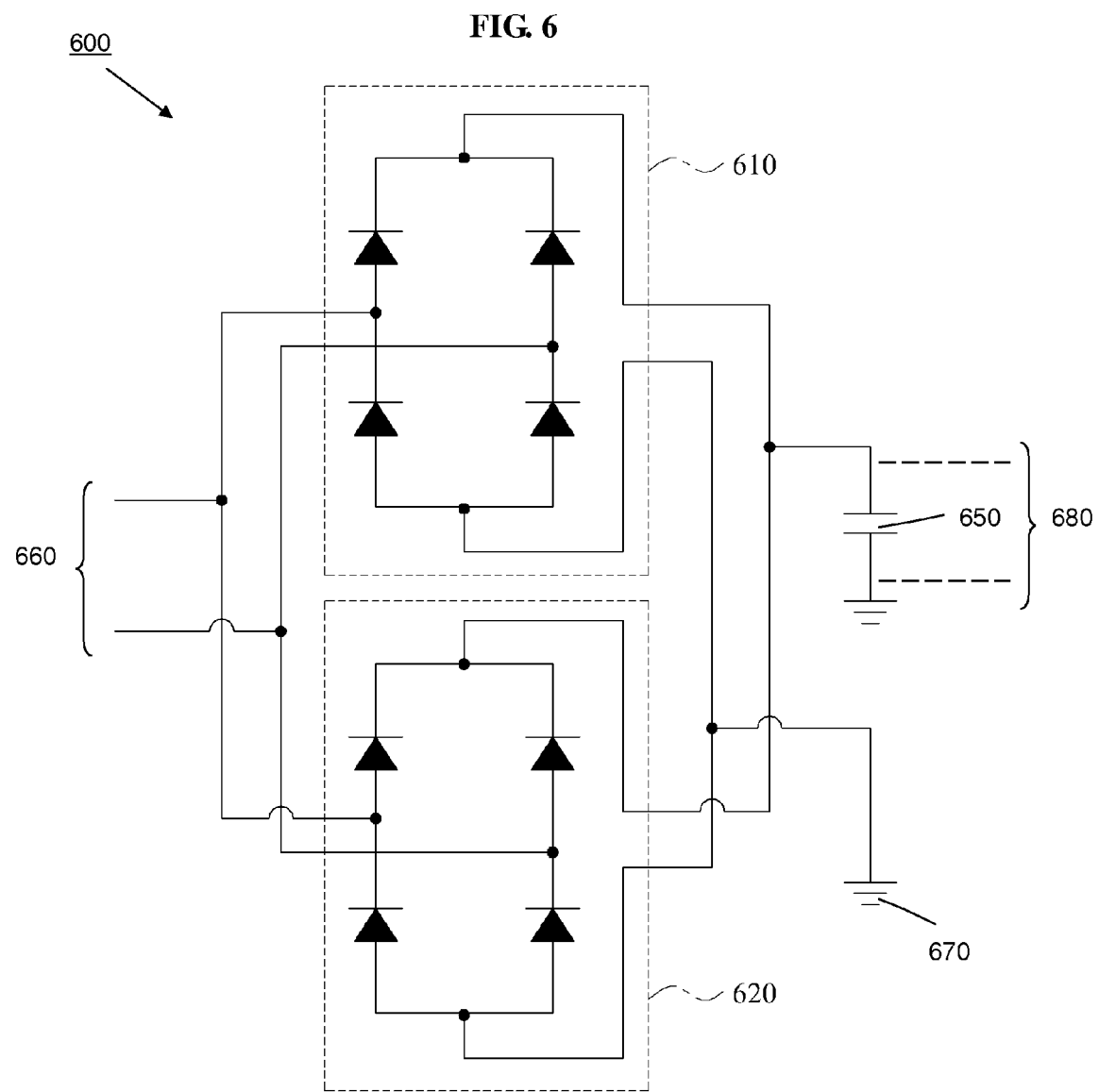
FIG. 6 is a diagram illustrating a rectifier including two discrete full bridge diode integrated circuits (DFBD ICs) connected in parallel.

FIG. 6 illustrates a rectifier 600 including two discrete full bridge diode integrated circuits (DFBD ICs) connected in parallel.

As shown, the rectifier 600 may include a first discrete full bridge diode integrated circuit (DFBD IC) 610 and a second DFBD IC 620 that are connected in parallel. The first DFBD IC 610 and the second DFBD IC 620 may each include an integrated circuit that is packaged to include four diodes arranged in a full bridge diode circuit. For instance, each of the DFBD ICs 610 and 620 may be a conventional full bridge diode circuit configuration. The diodes forming the full bridge diode circuit may be Schottky diodes, for example. Although, it will be appreciated that other types of diodes may also be used in other embodiments.

The rectifier 600 may connect to an AC voltage source via input paths 660. Each of the input paths 660 connects to the first DFBD IC 610 and the second DFBD IC 620.

The voltage output from the first DFBD IC 610 and the second DFBD IC 620 may be accumulated in a (reservoir) capacitor 650, for instance. As shown, each of the DFBD ICs 610 and 620 may be connected to the capacitor 650 and the ground 670. Thus, the DFBD ICs 610 and 620 formed multiple concurrent paths for the AC signal through the rectifier 600.

Output voltage 680 may be measured and/or tapped (i.e., output), for example, across the capacitor 650. For example, output paths (shown as dotted-lines) may be provided for receiving output voltage 680. The capacitor 650 need not be provided in all embodiments. Although, it will be appreciated that the addition of the capacitor 650 may be desirable because while the bridge supplies an output of fixed polarity, it is of continuously varying or "pulsating" magnitude, commonly referred to as "ripple." Thus, the capacitor 650 helps to "smooth" or to lessen the variation in the rectified AC output voltage from the bridge.

In some embodiments, one or more additional DFBD ICs may be connected in parallel to the first DFBD IC 610 and the second DFBD IC 620. For example, three or more DFBD ICs may be connected in parallel.

While integrated circuits (ICs) having a full bridge diode circuit have been described above, it will be appreciated that the full bridge diode circuit need not be fabricated as an integrated circuit. For instance, the diodes forming the full bridge diode circuits could be wired together and/or otherwise connected without integrated packaging.

The high-efficiency rectifiers described herein may be provided in various electronic devices where voltage conversion is desired, such as from AC to DC. In one or more embodiments, the rectifier may be provided in a wireless power receiver of a wireless power transmission system.

Referring again to FIG. 1, the source resonator and/or the target resonator of the wireless power transmission system may be configured as a helix coil structured resonator, a spiral coil structured resonator, a meta-structured resonator, or the like, in various embodiments.

An electromagnetic characteristic of many materials found in nature is that they have a unique magnetic permeability or a unique permittivity. Most materials typically have a positive magnetic permeability or a positive permittivity. Thus, for these materials, a right hand rule may be applied to an electric field, a magnetic field, and a pointing vector and thus, the corresponding materials may be referred to as right handed materials (RHMs).

On the other hand, a material having a magnetic permeability or a permittivity which is not ordinarily found in nature or is artificially-designed (or man-made) may be referred to herein as a "metamaterial." Metamaterials may be classified into an epsilon negative (ENG) material, a mu negative (MNG) material, a double negative (DNG) material, a negative refractive index (NRI) material, a left-handed (LH) material, and the like, based on a sign of the corresponding permittivity or magnetic permeability.

One or more of the materials of the embodiment disclosed herein may be metamaterials. The magnetic permeability may indicate a ratio between a magnetic flux density occurring with respect to a given magnetic field in a corresponding material and a magnetic flux density occurring with respect to the given magnetic field in a vacuum state. The permittivity indicates a ratio between an electric flux density, occurring with respect to a given electric field in a corresponding material, and an electric flux density, occurring with respect to the given electric field, in a vacuum state. The magnetic permeability and the permittivity, in some embodiments, may be used to determine a propagation constant of a corresponding material in a given frequency or a given wavelength. An electromagnetic characteristic of the corresponding material may be determined based on the magnetic permeability and the permittivity. According to an aspect, the metamaterial may be easily disposed in a resonance state without significant material size changes. This may be practical for a relatively large wavelength area or a relatively low frequency area, for instance.

Figure 7:
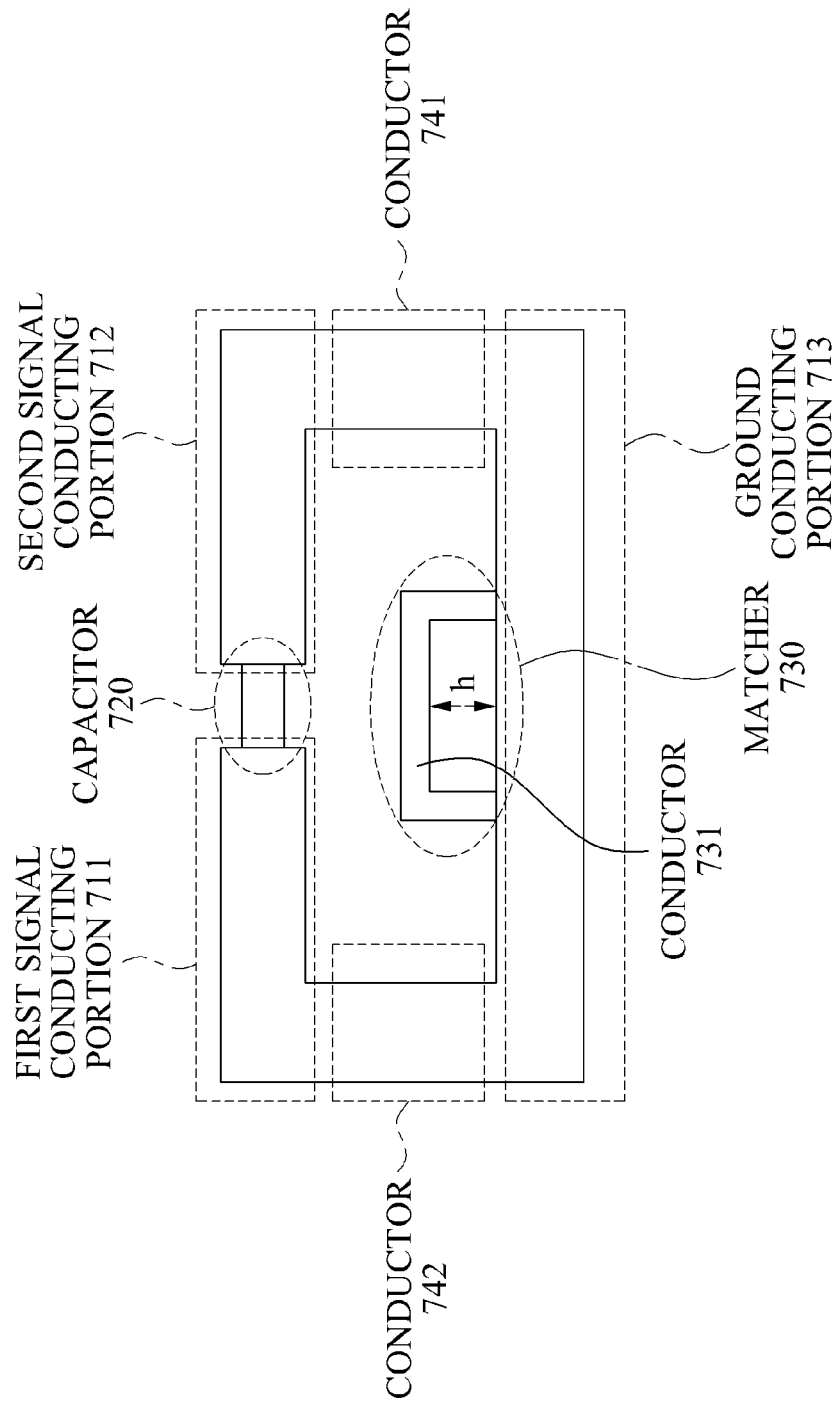
FIGS. 7 through 13 are diagrams illustrating various resonator structures.

FIG. 7 illustrates a resonator 700 having a two-dimensional (2D) structure.

As shown, the resonator 700 having the 2D structure may include a transmission line, a capacitor 720, a matcher 730, and conductors 741 and 742. The transmission line may include, for instance, a first signal conducting portion 711, a second signal conducting portion 712, and a ground conducting portion 713.

The capacitor 720 may be inserted or otherwise positioned in series between the first signal conducting portion 711 and the second signal conducting portion 712 so that an electric field may be confined within the capacitor 720. In various implementations, the transmission line may include at least one conductor in an upper portion of the transmission line, and may also include at least one conductor in a lower portion of the transmission line. A current may flow through the at least one conductor disposed in the upper portion of the transmission line and the at least one conductor disposed in the lower portion of the transmission may be electrically grounded. As shown in FIG. 7, the resonator 700 may be configured to have a generally 2D structure. The transmission line may include the first signal conducting portion 711 and the second signal conducting portion 712 in the upper portion of the transmission line, and may include the ground conducting portion 713 in the lower portion of the transmission line.

As shown, the first signal conducting portion 711 and the second signal conducting portion 712 may be disposed to face the ground conducting portion 713 with current flowing through the first signal conducting portion 711 and the second signal conducting portion 712.

In some implementations, one end of the first signal conducting portion 711 may be electrically connected (i.e., shorted) to a conductor 742, and another end of the first signal conducting portion 711 may be connected to the capacitor 720. And one end of the second signal conducting portion 712 may be grounded to the conductor 741, and another end of the second signal conducting portion 712 may be connected to the capacitor 720. Accordingly, the first signal conducting portion 711, the second signal conducting portion 712, the ground conducting portion 713, and the conductors 741 and 742 may be connected to each other, such that the resonator 700 may have an electrically "closed-loop" structure. The term "closed-loop structure" as used herein, may include a polygonal structure, for example, a circular structure, a rectangular structure, or the like that is electrically closed.

The capacitor 720 may be inserted into an intermediate portion of the transmission line. For example, the capacitor 720 may be inserted into a space between the first signal conducting portion 711 and the second signal conducting portion 712. The capacitor 720 may be configured, in some instances, as a lumped element, a distributed element, or the like. In one implementation, a distributed capacitor may be configured as a distributed element and may include zig-zagged conductor lines and a dielectric material having a relatively high permittivity between the zigzagged conductor lines.

When the capacitor 720 is inserted into the transmission line, the resonator 700 may have a property of a metamaterial, as discussed above. For example, the resonator 700 may have a negative magnetic permeability due to the capacitance of the capacitor 720. If so, the resonator 700 may be referred to as a mu negative (MNG) resonator. Various criteria may be applied to determine the capacitance of the capacitor 720. For example, the various criteria for enabling the resonator 700 to have the characteristic of the metamaterial may include one or more of the following: a criterion for enabling the resonator 700 to have a negative magnetic permeability in a target frequency, a criterion for enabling the resonator 700 to have a zeroth order resonance characteristic in the target frequency, or the like. The resonator 700, also referred to as the MNG resonator 700, may also have a zeroth order resonance characteristic (i.e., having, as a resonance frequency, a frequency when a propagation constant is "0"). If the resonator 700 may has the zeroth order resonance characteristic, the resonance frequency may be independent with respect to a physical size of the MNG resonator 700. Moreover, by appropriately designing the capacitor 720, the MNG resonator 700 may sufficiently change the resonance frequency without substantially changing the physical size of the MNG resonator 700 may not be changed.

In a near field, for instance, the electric field may be concentrated on the capacitor 720 inserted into the transmission line. Accordingly, due to the capacitor 720, the magnetic field may become dominant in the near field. In one or more embodiments, the MNG resonator 700 may have a relatively high Q-factor using the capacitor 720 of the lumped element. Thus, it may be possible to enhance power transmission efficiency. For example, the Q-factor indicates a level of an ohmic loss or a ratio of a reactance with respect to a resistance in the wireless power transmission. The efficiency of the wireless power transmission may increase according to an increase in the Q-factor.

The MNG resonator 700 may include a matcher 730 for impedance-matching. For example, the matcher 730 may be configured to appropriately adjust the strength of a magnetic field of the MNG resonator 700, for instance. Depending on the configuration, current may flow in the MNG resonator 700 via a connector, or may flow out from the MNG resonator 700 via the connector. The connector may be connected to the ground conducting portion 713 or the matcher 730. In some instances, power may be transferred through coupling without using a physical connection between the connector and the ground conducting portion 713 or the matcher 730.

As shown in FIG. 7, the matcher 730 may be positioned within the loop formed by the loop structure of the resonator 700. The matcher 730 may adjust the impedance of the resonator 700 by changing the physical shape of the matcher 730. For example, the matcher 730 may include the conductor 731 for the impedance-matching positioned in a location that is separate from the ground conducting portion 713 by a distance h. Accordingly, the impedance of the resonator 700 may be changed by adjusting the distance h. In some instances, a controller may be provided to control the matcher 730 which generates and transmits a control signal to the matcher 730 directing the match to change its physical shape so that the impedance of the resonator may be adjusted. For example, the distance h between a conductor 731 of the matcher 730 and the ground conducting portion 713 may be increased or decreased based on the control signal. The controller may generate the control signal based on various factors.

As shown in FIG. 7, the matcher 730 may be configured as a passive element such as the conductor 731, for example. Of course, in other embodiments, the matcher 730 may be configured as an active element such as a diode, a transistor, or the like. If the active element is included in the matcher 730, the active element may be driven based on the control signal generated by the controller, and the impedance of the resonator 700 may be adjusted based on the control signal. For example, when the active element is a diode included in the matcher 730 the impedance of the resonator 700 may be adjusted depending on whether the diode is in an ON state or in an OFF state.

In some instances, a magnetic core may be further provided to pass through the MNG resonator 700. The magnetic core may perform a function of increasing a power transmission distance.

Figure 8:
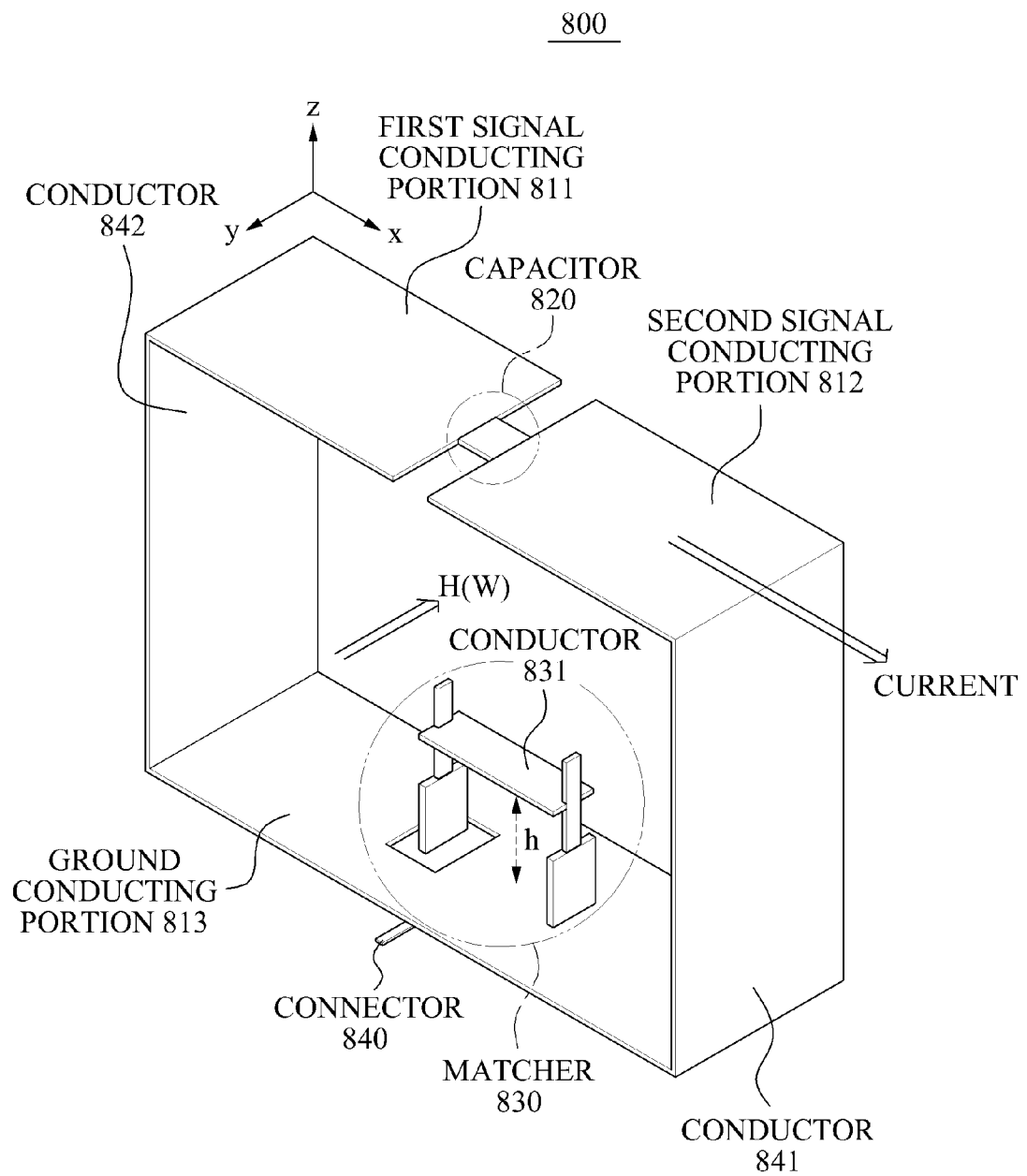

FIG. 8 illustrates a resonator 800 having a three-dimensional (3D) structure.

Referring to FIG. 8, the resonator 800 having the 3D structure may include a transmission line and a capacitor 820. The transmission line may include a first signal conducting portion 811, a second signal conducting portion 812, and a ground conducting portion 813. The capacitor 820 may be inserted, for instance, in series between the first signal conducting portion 811 and the second signal conducting portion 812 of the transmission link such that an electric field may be confined within the capacitor 820.

As shown in FIG. 8, the resonator 800 may have a generally 3D structure. The transmission line may include the first signal conducting portion 811 and the second signal conducting portion 812 in an upper portion of the resonator 800, and may include the ground conducting portion 813 in a lower portion of the resonator 800. The first signal conducting portion 811 and the second signal conducting portion 812 may be disposed to face the ground conducting portion 813. In this arrangement, current may flow in an x direction through the first signal conducting portion 811 and the second signal conducting portion 812. Due to the current, a magnetic field H(W) may be formed in a −y direction. However, it will be appreciated that, the magnetic field H(W) might also be formed in the opposite direction (e.g., a +y direction) in other implementations.

In one or more embodiments, one end of the first signal conducting portion 811 may be shorted to a conductor 842, and another end of the first signal conducting portion 811 may be connected to the capacitor 820. One end of the second signal conducting portion 812 may be grounded to the conductor 841, and another end of the second signal conducting portion 812 may be connected to the capacitor 820. Accordingly, the first signal conducting portion 811, the second signal conducting portion 812, the ground conducting portion 813, and the conductors 841 and 842 may be connected to each other, whereby the resonator 800 may have an electrically closed-loop structure. As shown in FIG. 8, the capacitor 820 may be inserted or otherwise positioned between the first signal conducting portion 811 and the second signal conducting portion 812. For example, the capacitor 820 may be inserted into a space between the first signal conducting portion 811 and the second signal conducting portion 812. The capacitor 820 may include, for example, a lumped element, a distributed element, or the like. In one implementation, a distributed capacitor having the shape of the distributed element may include zigzagged conductor lines and a dielectric material having a relatively high permittivity positioned between the zigzagged conductor lines.

When the capacitor 820 is inserted into the transmission line, the resonator 800 may have a property of a metamaterial in some instances, as discussed above.

For example, when a capacitance of the capacitor inserted is a lumped element, the resonator 800 may have the characteristic of the metamaterial. When the resonator 800 may has a negative magnetic permeability by appropriately adjusting the capacitance of the capacitor 820, the resonator 800 may also be referred to as an MNG resonator. Various criteria may be applied to determine the capacitance of the capacitor 820. For example, the various criteria may include, for instance, one or more of the following: a criterion for enabling the resonator 800 to have the characteristic of the metamaterial, a criterion for enabling the resonator 800 to have a negative magnetic permeability in a target frequency, a criterion enabling the resonator 800 to have a zeroth order resonance characteristic in the target frequency, or the like. Based on at least one criterion among the aforementioned criteria, the capacitance of the capacitor 820 may be determined.

The resonator 800, also referred to as the MNG resonator 800, may have a zeroth order resonance characteristic (i.e., having, as a resonance frequency, a frequency when a propagation constant is "0"). If the resonator 800 has a zeroth order resonance characteristic, the resonance frequency may be independent with respect to a physical size of the MNG resonator 800. Thus, by appropriately designing the capacitor 820, the MNG resonator 800 may sufficiently change the resonance frequency without substantially changing the physical size of the MNG resonator 800.

Referring to the MNG resonator 800 of FIG. 8, in a near field, the electric field may be concentrated on the capacitor 820 inserted into the transmission line. Accordingly, due to the capacitor 820, the magnetic field may become dominant in the near field. And, since the MNG resonator 800 having the zeroth-order resonance characteristic may have characteristics similar to a magnetic dipole, the magnetic field may become dominant in the near field. A relatively small amount of the electric field formed due to the insertion of the capacitor 820 may be concentrated on the capacitor 820 and thus, the magnetic field may become further dominant.

Also, the MNG resonator 800 may include a matcher 830 for impedance-matching. The matcher 830 may be configured to appropriately adjust the strength of magnetic field of the MNG resonator 800. An impedance of the MNG resonator 800 may be determined by the matcher 830. In one or more embodiments, current may flow in the MNG resonator 800 via a connector 840, or may flow out from the MNG resonator 800 via the connector 840. And the connector 840 may be connected to the ground conducting portion 813 or the matcher 830.

As shown in FIG. 8, the matcher 830 may be positioned within the loop formed by the loop structure of the resonator 800. The matcher 830 may be configured to adjust the impedance of the resonator 800 by changing the physical shape of the matcher 830. For example, the matcher 830 may include the conductor 831 for the impedance-matching in a location separate from the ground conducting portion 813 by a distance h. The impedance of the resonator 800 may be changed by adjusting the distance h.

In some implementations, a controller may be provided to control the matcher 830. In this case, the matcher 830 may change the physical shape of the matcher 830 based on a control signal generated by the controller. For example, the distance h between the conductor 831 of the matcher 830 and the ground conducting portion 813 may be increased or decreased based on the control signal. Accordingly, the physical shape of the matcher 830 may be changed such that the impedance of the resonator 800 may be adjusted. The distance h between the conductor 831 of the matcher 830 and the ground conducting portion 813 may be adjusted using a variety of schemes. For example, a plurality of conductors may be included in the matcher 830 and the distance h may be adjusted by adaptively activating one of the conductors. Alternatively or additionally, the distance h may be adjusted by adjusting the physical location of the conductor 831 up and down. For instance, the distance h may be controlled based on the control signal of the controller. The controller may generate the control signal using various factors. As shown in FIG. 8, the matcher 830 may be configured as a passive element such as the conductor 831, for instance. Of course, in other embodiments, the matcher 830 may be configured as an active element such as, for example, a diode, a transistor, or the like. When the active element is included in the matcher 830, the active element may be driven based on the control signal generated by the controller, and the impedance of the resonator 800 may be adjusted based on the control signal. For example, if the active element is a diode included in the matcher 830, the impedance of the resonator 800 may be adjusted depending on whether the diode is in an ON state or in an OFF state.

In some implementations, a magnetic core may be further provided to pass through the resonator 800 configured as the MNG resonator. The magnetic core may perform a function of increasing a power transmission distance.

Figure 9:
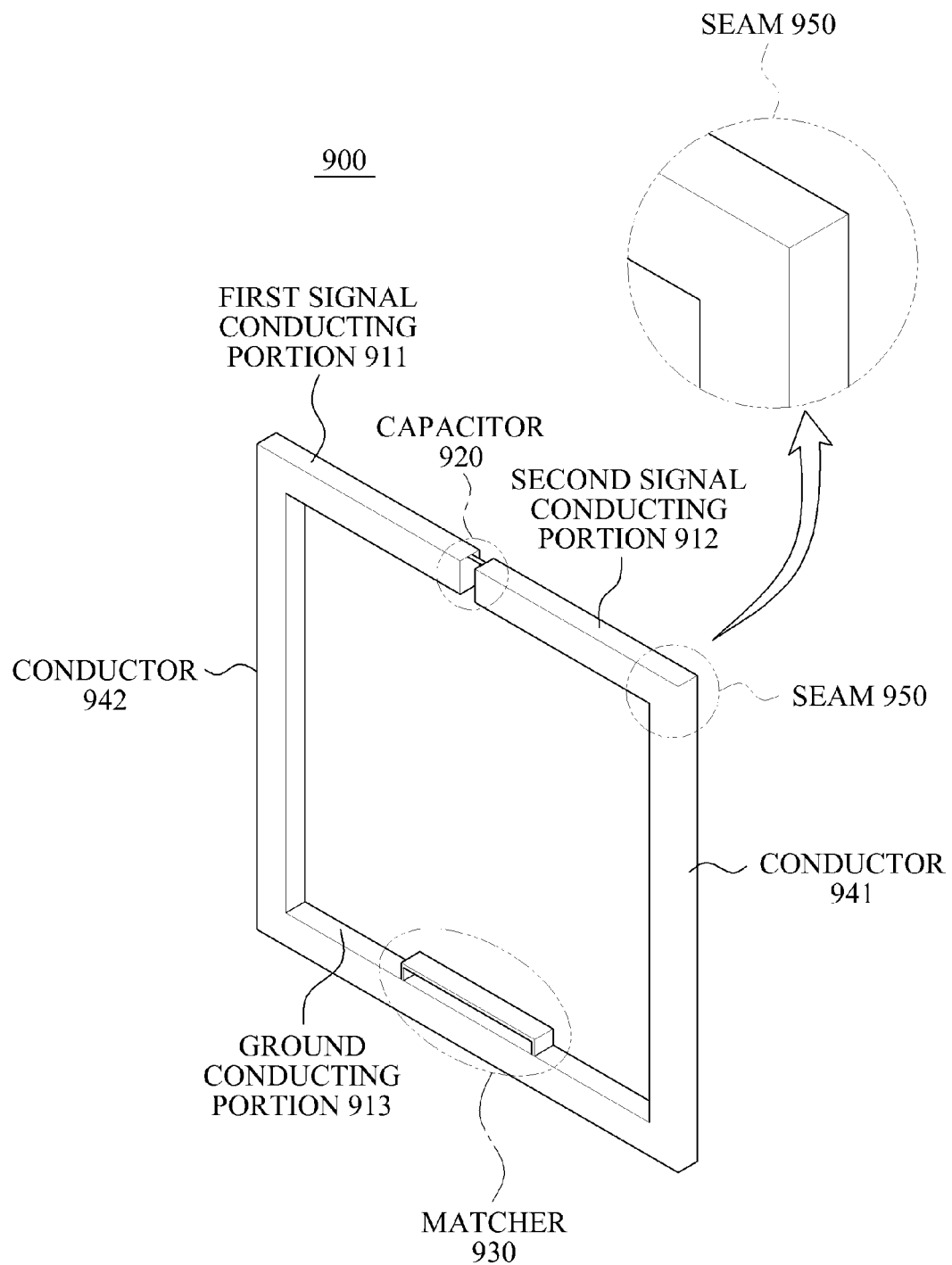

FIG. 9 illustrates a resonator 900 for a wireless power transmission configured as a bulky type. As used herein, the term "bulky type" may refer to a seamless connection connecting at least two parts in an integrated form.

Referring to FIG. 9, a first signal conducting portion 911 and a conductor 942 may be integrally formed instead of being separately manufactured and thereby be connected to each other. Similarly, the second signal conducting portion 912 and a conductor 941 may also be integrally manufactured.

When the second signal conducting portion 912 and the conductor 941 are separately manufactured and then are connected to each other, a loss of conduction may occur due to a seam 950. Thus, in some implementations, the second signal conducting portion 912 and the conductor 941 may be connected to each other without using a separate seam (i.e., seamlessly connected to each other). Accordingly, it is possible to decrease a conductor loss caused by the seam 950. For instance, the second signal conducting portion 912 and a ground conducting portion 913 may be seamlessly and integrally manufactured. Similarly, the first signal conducting portion 911, the conductor 942 and the ground conducting portion 913 may be seamlessly and integrally manufactured.

Figure 10:
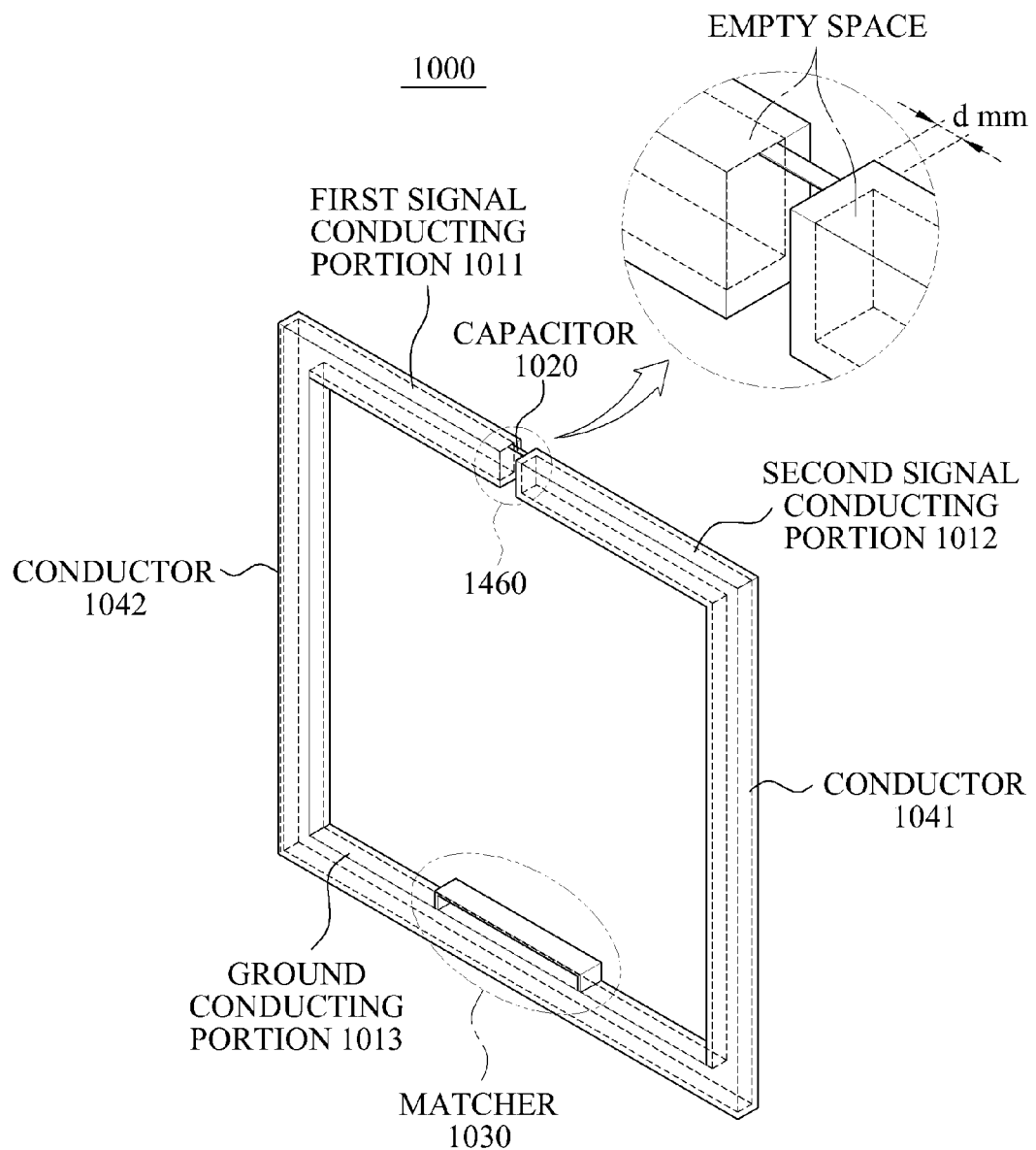

A matcher 930 may be provided that is similarly constructed as described herein in one or more embodiments FIG. 10 illustrates a resonator 1000 for a wireless power transmission, configured as a hollow type.

Referring to FIG. 10, each of a first signal conducting portion 1011, a second signal conducting portion 1012, a ground conducting portion 1013, and conductors 1041 and 1042 of the resonator 1000 configured as the hollow type structure. As used herein the term "hollow type" refers to a configuration that may include an empty space inside.

In a given resonance frequency, an active current may be modeled to flow in only a portion of the first signal conducting portion 1011 instead of all of the first signal conducting portion 1011, the second signal conducting portion 1012 instead of all of the second signal conducting portion 1012, the ground conducting portion 1013 instead of all of the ground conducting portion 1013, and the conductors 1041 and 1042 instead of all of the conductors 1041 and 1042. When a depth of each of the first signal conducting portion 1011, the second signal conducting portion 1012, the ground conducting portion 1013, and the conductors 1041 and 1042 is significantly deeper than a corresponding skin depth in the given resonance frequency, it may be ineffective. The significantly deeper depth may, however, increase a weight or manufacturing costs of the resonator 1000 in some instances.

Accordingly, for the given resonance frequency, the depth of each of the first signal conducting portion 1011, the second signal conducting portion 1012, the ground conducting portion 1013, and the conductors 1041 and 1042 may be appropriately determined based on the corresponding skin depth of each of the first signal conducting portion 1011, the second signal conducting portion 1012, the ground conducting portion 1013, and the conductors 1041 and 1042. When each of the first signal conducting portion 1011, the second signal conducting portion 1012, the ground conducting portion 1013, and the conductors 1041 and 1042 has an appropriate depth deeper than a corresponding skin depth, the resonator 1000 may become light, and manufacturing costs of the resonator 1000 may also decrease.

For example, as shown in FIG. 10, the depth of the second signal conducting portion 1012 (as further illustrated in the enlarged view region 1060 indicated by a circle) may be determined as "d" mm and d may be determined according to $$d = \frac{1}{\sqrt{\pi f \mu \sigma}}.$$

Here, f denotes a frequency, μ denotes a magnetic permeability, and σ denotes a conductor constant. In one implementation, when the first signal conducting portion 1011, the second signal conducting portion 1012, the ground conducting portion 1013, and the conductors 1041 and 1042 are made of a copper and they may have a conductivity of $5.8 \times 10^7$ siemens per meter (S·m$^{-1}$), the skin depth may be about 0.6 mm with respect to 10 kHz of the resonance frequency and the skin depth may be about 0.006 mm with respect to 100 MHz of the resonance frequency.

A capacitor 1020 and a matcher 1030 may be provided that are similarly constructed as described herein in one or more embodiments.

Figure 11:
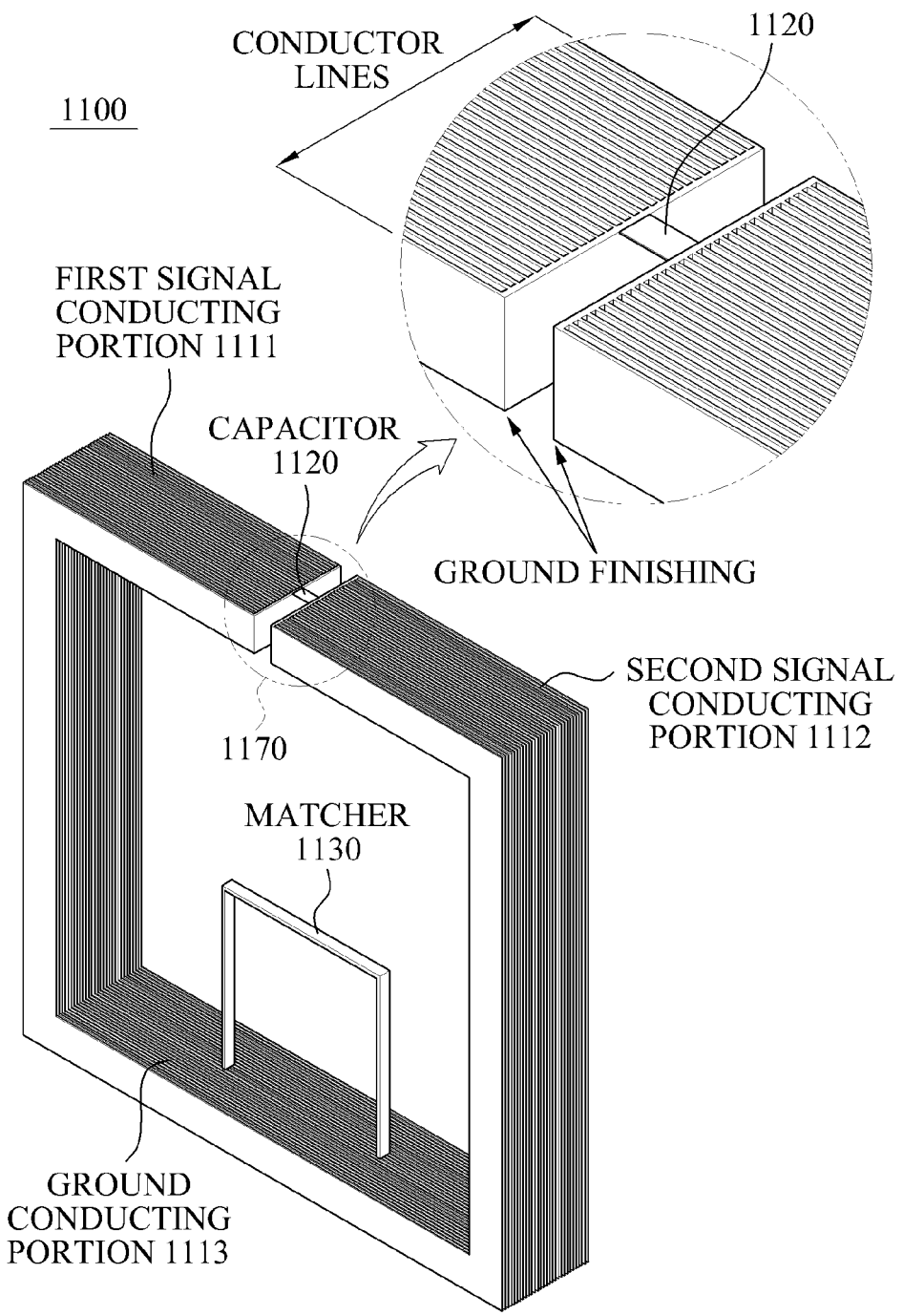

FIG. 11 illustrates a resonator 1100 for a wireless power transmission using a parallel-sheet.

Referring to FIG. 11, the parallel-sheet may be applicable to each of a first signal conducting portion 1111 and a second signal conducting portion 1112 included in the resonator 1100.

Each of the first signal conducting portion 1111 and the second signal conducting portion 1112 may not be a perfect conductor and thus, may have an inherent resistance. Due to this resistance, an ohmic loss may occur. The ohmic loss may decrease a Q-factor and also decrease a coupling effect.

By applying the parallel-sheet to each of the first signal conducting portion 1111 and the second signal conducting portion 1112, it may be possible to decrease the ohmic loss, and to increase the Q-factor and the coupling effect. Referring to the enlarged view portion 1170 indicated by a circle, when the parallel-sheet is applied, each of the first signal conducting portion 1111 and the second signal conducting portion 1112 may include a plurality of conductor lines. The plurality of conductor lines may be disposed in parallel, and may be electrically connected (i.e., shorted) at an end portion of each of the first signal conducting portion 1111 and the second signal conducting portion 1112.

When the parallel-sheet is applied to each of the first signal conducting portion 1111 and the second signal conducting portion 1112, the plurality of conductor lines may be disposed in parallel. Accordingly, a sum of resistances having the conductor lines may decrease. Consequently, the resistance loss may decrease, and the Q-factor and the coupling effect may increase.

A capacitor 1120 and a matcher 1130 positioned on the ground conducting portion 1113 may be provided that are similarly constructed as described herein in one or more embodiments.

Figure 12:
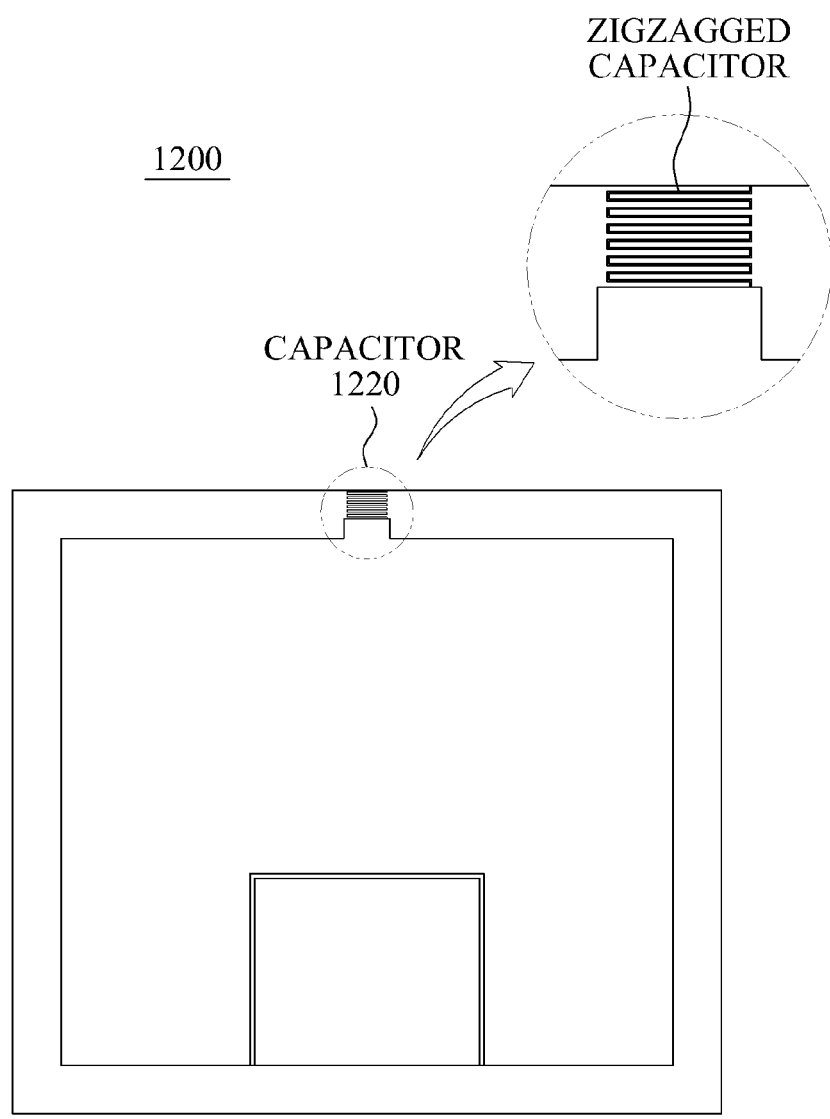

FIG. 12 illustrates a resonator 1200 for a wireless power transmission, including a distributed capacitor.

Referring to FIG. 12, a capacitor 1220 included in the resonator 1200 is configured for the wireless power transmission. A capacitor used as a lumped element may have a relatively high equivalent series resistance (ESR). A variety of schemes have been proposed to decrease the ESR contained in the capacitor of the lumped element. According to an embodiment, by using the capacitor 1220 as a distributed element, it may be possible to decrease the ESR. As will be appreciated, a loss caused by the ESR may decrease a Q-factor and a coupling effect.

As shown in FIG. 12, the capacitor may be configured as a conductive line having the zigzagged structure.

By employing the capacitor 1220 as the distributed element, it may be possible to decrease the loss occurring due to the ESR in some instances. In addition, by disposing a plurality of capacitors as lumped elements, it is possible to decrease the loss occurring due to the ESR. Since a resistance of each of the capacitors as the lumped elements decreases through a parallel connection, active resistances of parallel-connected capacitors as the lumped elements may also decrease whereby the loss occurring due to the ESR may decrease. For example, by employing ten capacitors of 1 pF each instead of using a single capacitor of 10 pF, it may be possible to decrease the loss occurring due to the ESR in some instances.

Figure 13A:
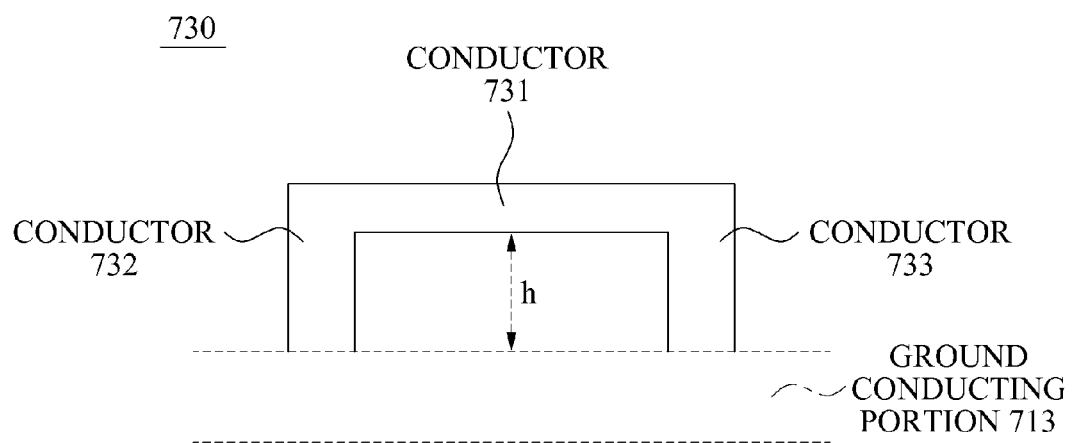
Figure 13B:
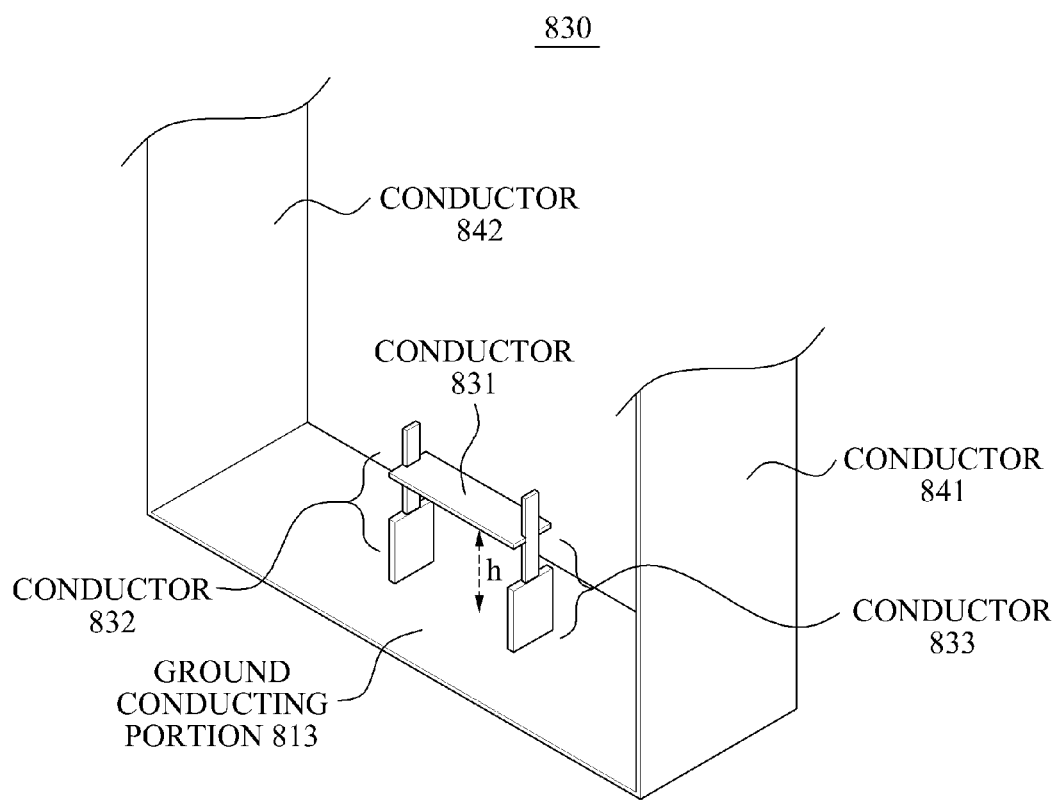

FIG. 13A illustrates one embodiment of the matcher 730 used in the resonator 700 provided in the 2D structure of FIG. 7, and FIG. 13B illustrates an example of the matcher 830 used in the resonator 800 provided in the 3D structure of FIG. 8.

FIG. 13A illustrates a portion of the 2D resonator including the matcher 730, and FIG. 13B illustrates a portion of the 3D resonator of FIG. 8 including the matcher 830.

Referring to FIG. 13A, the matcher 730 may include the conductor 731, a conductor 732, and a conductor 733. The conductors 732 and 733 may be connected to the ground conducting portion 713 and the conductor 731. The impedance of the 2D resonator may be determined based on a distance h between the conductor 731 and the ground conducting portion 713. The distance h between the conductor 731 and the ground conducting portion 713 may be controlled by the controller. The distance h between the conductor 731 and the ground conducting portion 713 can be adjusted using a variety of schemes. For example, the variety of schemes may include, for instance, one or more of the following: a scheme of adjusting the distance h by adaptively activating one of the conductors 731, 732, and 733, a scheme of adjusting the physical location of the conductor 731 up and down, and/or the like.

Referring to FIG. 13B, the matcher 830 may include the conductor 831, a conductor 832, a conductor 833 and conductors 841 and 842. The conductors 832 and 833 may be connected to the ground conducting portion 813 and the conductor 831. Also, the conductors 841 and 842 may be connected to the ground conducting portion 813. The impedance of the 3D resonator may be determined based on a distance h between the conductor 831 and the ground conducting portion 813. The distance h between the conductor 831 and the ground conducting portion 813 may be controlled by the controller, for example. Similar to the matcher 730 included in the 2D structured resonator, in the matcher 830 included in the 3D structured resonator, the distance h between the conductor 831 and the ground conducting portion 813 may be adjusted using a variety of schemes. For example, the variety of schemes may include, for instance, one or more of the following: a scheme of adjusting the distance h by adaptively activating one of the conductors 831, 832, and 833, a scheme of adjusting the physical location of the conductor 831 up and down, or the like.

In some implementations, the matcher may include an active element. Thus, a scheme of adjusting an impedance of a resonator using the active element may be similar as described above. For example, the impedance of the resonator may be adjusted by changing a path of a current flowing through the matcher using the active element.

Figure 14:
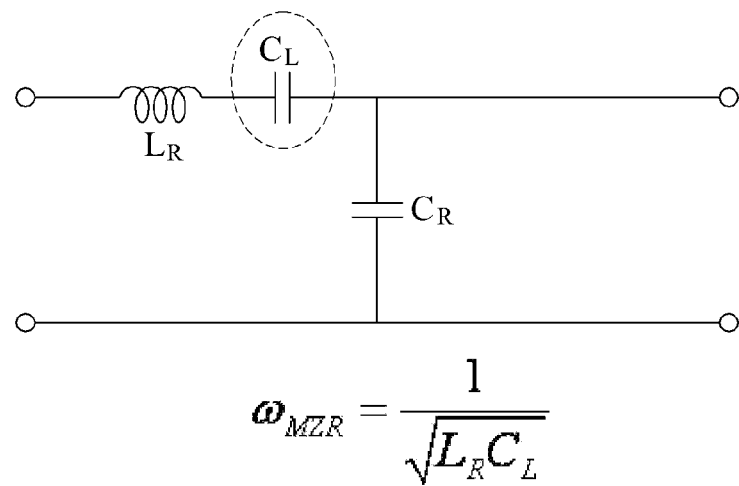
FIG. 14 is a diagram illustrating one equivalent circuit of a resonator for wireless power transmission of FIG. 7.

FIG. 14 illustrates one equivalent circuit of the resonator 700 for the wireless power transmission of FIG. 7.

The resonator 700 of FIG. 7 for the wireless power transmission may be modeled to the equivalent circuit of FIG. 14. In the equivalent circuit depicted in FIG. 14, $L_R$ denotes an inductance of the power transmission line, $C_L$ denotes the capacitor 720 that is inserted in a form of a lumped element in the middle of the power transmission line of FIG. 7, and $C_R$ denotes a capacitance between the power transmissions and/or ground.

In some instances, the resonator 700 may have a zeroth resonance characteristic. For example, when a propagation constant is "0", the resonator 700 may be assumed to have $\omega_{MZR}$ as a resonance frequency. The resonance frequency $\omega_{MZR}$ may be expressed by Equation 3.

$$\omega_{MZR} = \frac{1}{\sqrt{L_R C_L}} \qquad \text{[Equation 3]}$$

In Equation 3, MZR denotes a Mu zero resonator.

Referring to Equation 3, the resonance frequency $\omega_{MZR}$ of the resonator 700 may be determined by $L_R/C_L$. A physical size of the resonator 700 and the resonance frequency $\omega_{MZR}$ may be independent with respect to each other. Since the physical sizes are independent with respect to each other, the physical size of the resonator 700 may be sufficiently reduced.

According to one or more embodiments, there may be provided a high efficiency rectifier and a wireless power receiver including the rectifier. The rectifier may be in a form of a full bridge diode, and may include dual diodes. Each of the dual diodes may include two diodes connected in parallel. When the two diodes are connected in parallel, a current may be distributed to the two diodes and thus, a voltage drop may decrease.

One or more of the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa. In addition, a non-transitory computer-readable storage medium may be distributed among computer systems connected through a network and non-transitory computer-readable codes or program instructions may be stored and executed in a decentralized manner. A number of example embodiments have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A rectifier comprising:
   discrete full bridge diode integrated circuits (DFBD ICs), connected in parallel, wherein the DFBD ICs each comprise an integrated IC including a full bridge diode circuit, the DFBD ICs comprising a first path configured to output a voltage in response to the phase of an input voltage being positive and a second path configured to output a voltage in response to the phase of the input voltage being negative, wherein the DFBD ICs are configured to output a direct current (DC) voltage for an alternating current (AC) signal inputted to the DFBD ICs, wherein the DFBD ICs rectify the AC signal into DC without using a transistor to control the DFBD ICs.

2. The rectifier of claim 1, further comprising a capacitor configured to accumulate voltage output from the DFBD ICs.

3. The rectifier of claim 1, wherein the DC voltage substantially corresponds to a maximum amplitude of the AC signal.

4. The rectifier of claim 1, wherein the DFBD ICs each comprise four diodes arranged in a full bridge diode circuit configuration.

5. A wireless power receiver comprising:
- a target resonator configured to receive AC electromagnetic energy from a source resonator; and
- the rectifier of claim 1 configured to rectify AC energy received from the target resonator to output a signal.

6. The wireless power receiver of claim 5, further comprising:
- a DC/DC voltage converter configured to adjust a signal level of the output signal.

7. A rectifier comprising:
- full bridge diode circuits (DFBD ICs) connected in parallel, comprising a first path configured to output a voltage in response to the phase of an input voltage being positive and a second path configured to output a voltage in response to the phase of the input voltage being negative, wherein the DFBD ICs are configured to output a direct current (DC) voltage for an alternating current (AC) signal inputted to the DFBD ICs,
wherein the DFBD ICs rectify the AC signal into DC without using a transistor to control the DFBD ICs.

* * * * *